May 3, 1966     R. A. CONRAD     3,249,137
EGG PERFORATING MACHINE

Filed Oct. 30, 1963     3 Sheets-Sheet 1

INVENTOR.
RENÉ ARTHUR CONRAD
BY Alexander Riaboff
ATTORNEY

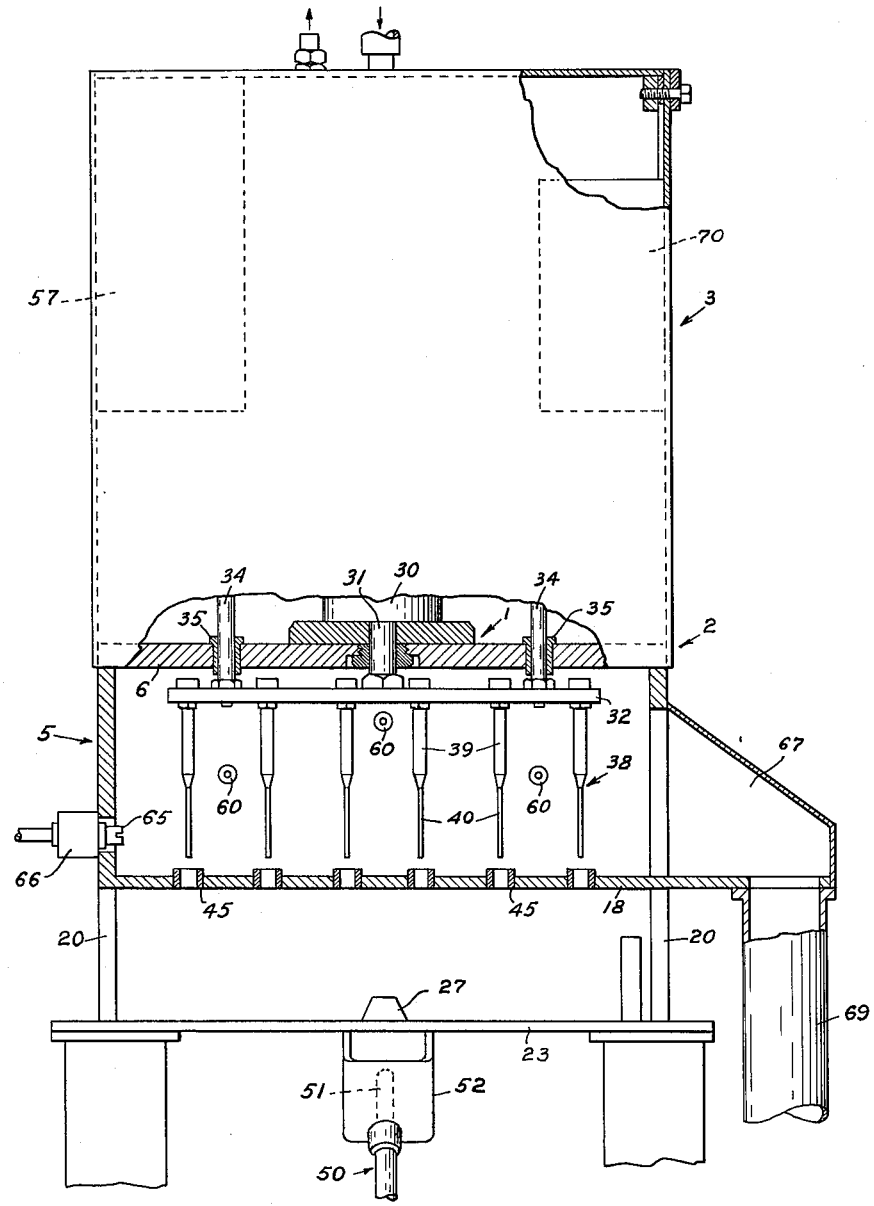

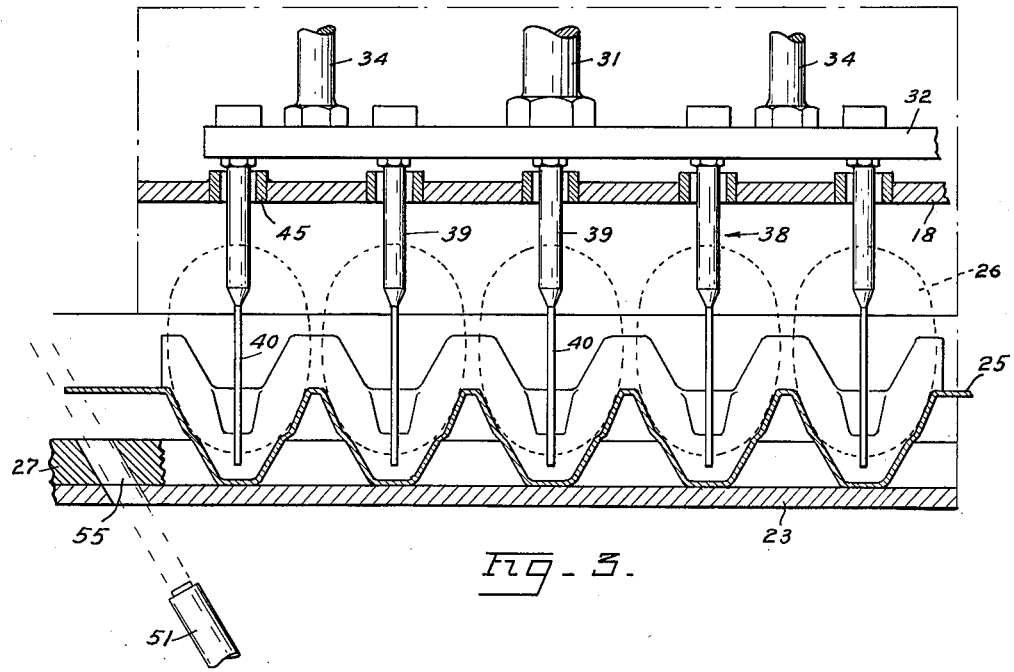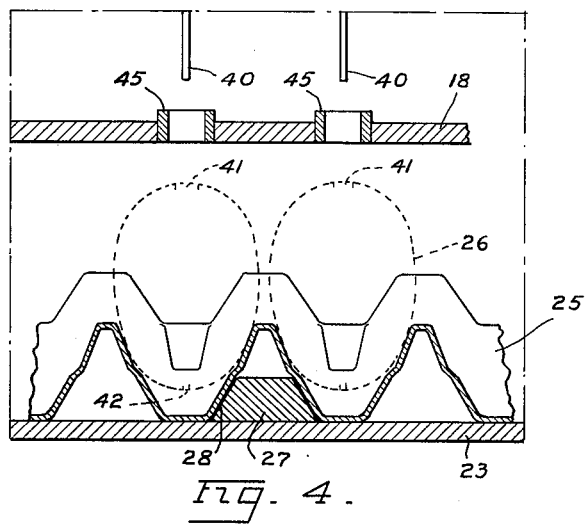

United States Patent Office 3,249,137
Patented May 3, 1966

3,249,137
EGG PERFORATING MACHINE
René A. Conrad, 50 Laurel Hill Court, San Mateo, Calif.
Filed Oct. 30, 1963, Ser. No. 320,132
5 Claims. (Cl. 146—2)

This invention relates to an egg perforating machine.

The primary object of this invention is the provision of a simple and efficient machine for simultaneous perforation of a plurality of eggs on both ends as a preliminary step to the evacuation of the contents thereof by a special egg evacuating machine described in and comprising the subject matter of, the United States copending patent application, Serial No. 284,500, filed May 31, 1963.

Another object of this invention is to provide a machine of the type described which operates automatically and with extreme speed and accuracy.

Another object of this invention is to provide a machine of the type described in which the egg penetrating devices are continuously sterilized during the egg perforating operation, thus rendering the machine sanitary and preventing contamination of perforated eggs.

This invention is illustrated in the drawings forming a part of this application in which:

FIGURE 2 is a front elevation of the machine, as seen in direction of an arrow 2 shown in FIGURE 1, some parts being cut off in order to disclose the inner mechanism of the machine.

FIGURE 3 is an enlarged central vertical cross-section of the lower portion of the egg perforating mechanism, showing a carton of eggs penetrated by the perforating devices, and FIGURE 4 is an enlarged cross-section similar to FIGURE 3 taken on the line 4—4 of FIGURE 3, but showing the egg perforating devices withdrawn from the eggs.

Figure 1:
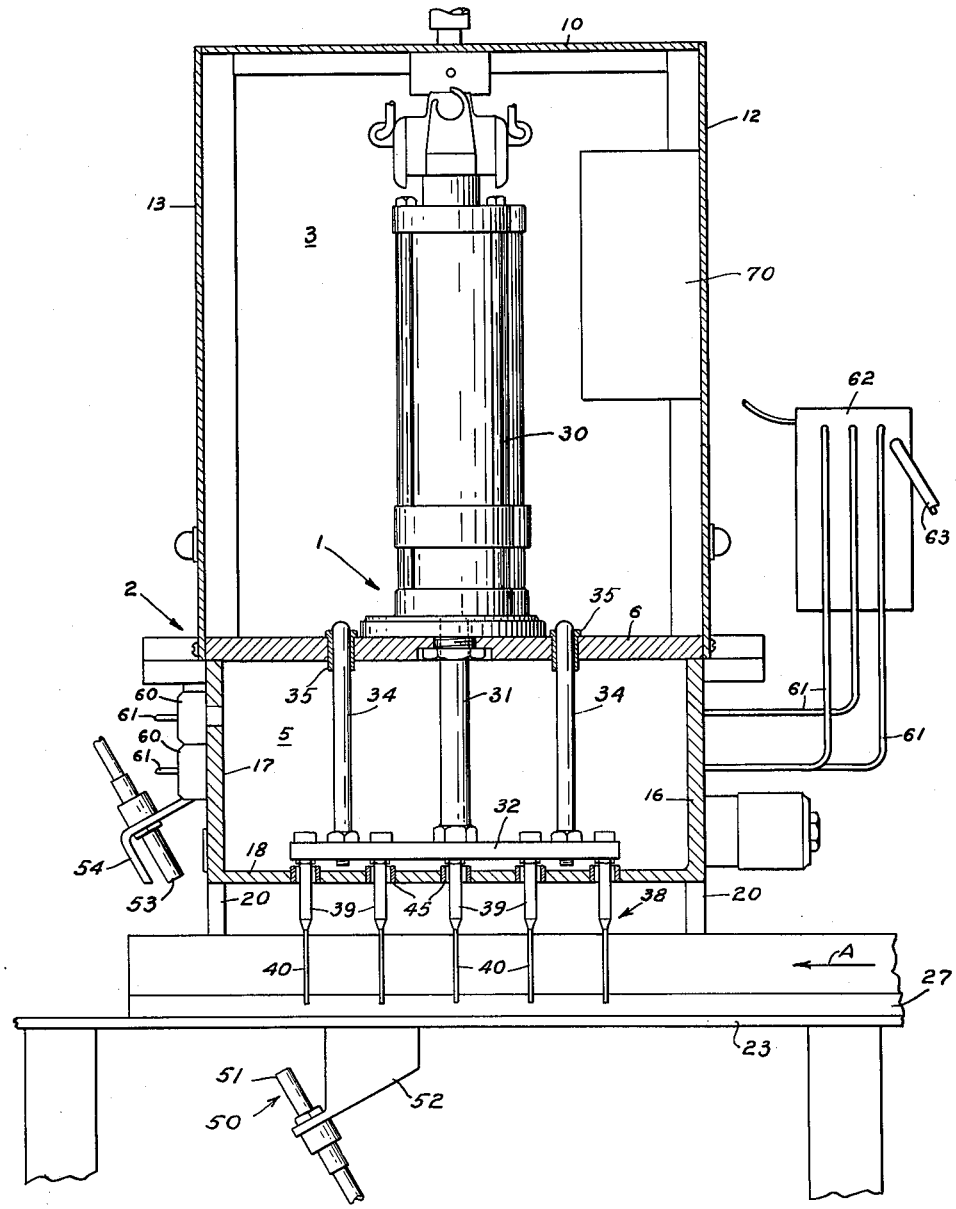
FIGURE 1 is a central vertical cross-section of the machine, some parts being shown in elevation.

In general, the egg perforating machine is designed to perforate in one operation a commercial carton of eggs arranged in six rows of five eggs in each row, total being pins from the eggs back to its initial position. The extreme speed and its requires only one-fortieth of a second to perforate the eggs and to withdraw the perforating pins from the eggs back to it initial position. The machine is actuated automatically by an electric eye when the carton of eggs, moved by an operator reaches a certain predetermined position under said pins, whereupon the latter strike downwardly through said eggs and withdraw. The operator pushes the carton with perforated eggs away from the machine and advances another carton under the same. While the machine is in operation, special nozzles spray the egg perforating pins with a very fine germicidal mist, thus sterilizing the pins and the space around the same in order to prevent contamination of the perforated eggs by the pins. The mist is blown away by a nozzle which is operated for a half second after each egg perforating operation. The latter nozzle issues a blast of air under the pressure of 100 p.s.i. and clears the pin surrounding area of the mist.

In detail, the egg perforating machine consists of an egg perforating mechanism 1 enclosed in a container 2. The latter consists of an upper chamber 3 which rests on a lower chamber 5, and is separated from the latter by a heavy floor 6. The upper chamber 3 is completely enclosed on its top 10, sides 11, front 12 and back 13. The lower chamber is also enclosed on sides 15, front 16 and back 17 and is provided with a heavy bottom 18.

The lower chamber 5 rests on supports 20 secured to an elongated slide 23. The chamber 5 is arranged above said slide so that a commercial carton 25 with eggs 26 can freely pass under said lower chamber. The carton 25 contains six rows of five eggs in each row. In order to slide said carton under the lower chamber in a certain predetermined way a carton guiding bar 27 is provided on said slide which bar is arranged longitudinally and centrally on said slide and secured thereto. The bar 27 is adapted to fit a central longitudinal depression 28 in said carton. The operator places the carton 25 on said slide so that the depression 28 fits over said bar 27, thus preventing the lateral displacement of said carton in relation to said lower chamber and moves the carton in a direction indicated by an arrow A in FIGURE 1.

The upper chamber 3 houses a compressed air motor 30 arranged vertically and secured to the top 10 and the floor 6 in the center of said chamber. The air motor 30 is a standard product of Bellow Super Speed Air Motor Co. and sold under the name of High Speed Air Motor BFFSSEJM-AR-115-5C-40.

Said motor includes a shaft 31 which extends downwardly from said motor into the lower chamber 5, and carries on its lower end, secured thereto, a platform 32 which is located in said lower chamber. The upper surface of said platform carries a plurality of guiding bars 34 secured thereto which extend upwardly into the upper chamber 3 through bearings 35 in the floor 6. The bars 34 stabilize the platform during its operation.

The lower side of said platform is provided with egg perforating pins 38 arranged in six rows each containing five pins, the distances between the pins and their arrangement being exactly the same as those between the eggs in the commercial carton 25.

The pins 38 are formed with a wired upper part 39, which is 5/32 inch diameter, and a narrower lower part 40, which is 1/8 inch diameter. When the pin 38 penetrates an egg it forms a larger hole 41 in the top and a smaller hole 42 in the lower end of the same.

Normally the pins 38 are located in the lower chamber 5. A small bushing 45 is inserted in the bottom 18 opposite each pin, so that its upper rim protrudes above the bottom. The inner diameter of the bushing 45 is somewhat larger than that of the upper part 39 of the pin, and the latter can easily pass therethrough.

The air motor 30 is actuated by a photocell 50 arranged at the rear end of the device, including a source of light 51 secured to the lower side of the slide 23 by a support 52 and a scanner 53 attached to the rear wall of the chamber 5 by a support 54, the light passing through a hole 55 in the slide and in the bar 27 thereon to said scanner. When a carton of eggs reaches the position shown in FIGURE 3, in which the front flange of the carton interrupts the light beam, the photocell, through a relay 57, activates the air motor 30 and thus sends the pins 38 downwardly through the eggs.

The egg perforating machine also includes means for continual sterilization of the pins 38 and the chamber 5, which means consists of a plurality of nozzles 60 arranged in the walls of said chamber and connected by flexible tubes 61 to a tank 62. The latter is manufactured and sold under the name of Wesco Mist Coolant System by C. Z. Norton Co. in San Francisco, California. However, instead of coolant fluid, a suitable germicide is used in said tank. A pipe 63 delivers compressed air to said tank, wherein it is mixed with said germicide fluid and delivered to said nozzles, which issue sprays a fine mist which fills said chamber 5.

An air nozzle 65 is also provided on the side wall of said chamber connected to a source of compressed air at a pressure of 100 p.s.i. The latter nozzle is opened by a solenoid valve 66 automatically for a half second after each egg perforating operation. The blast of air delivered by said nozzle sweeps the mist and moisture in the lower chamber 5 into a closed outlet 67 located opposite said nozzle, wherefrom the same is discharged through a pipe 69 secured to the bottom of said outlet into a recovery tank, not shown in the drawings. The raised rims of the bushings 45 prevent the moisture accumulating on the bottom 18 in the chamber 5 to flow down to the slide 23.

The solenoid valve is operated by a timer 70 located in the upper chamber 3. The timers 70 is, in turn, activated by the photocell 50 through the relay 57 and is so adjusted as to operate said solenoid valve for a half second after the completion of each egg perforating operation.

The operation of the device is as follows. An operator turns on the main switch of the device, not shown in the drawings, places a commercial carton 25 with eggs on the slide 23, so that the central longitudinal depression 28 in said carton straddles the guiding bar 27 on said slide, and pushes the carton toward the photocell 50. When the carton reaches the position shown in FIGURE 3, the flange of the carton interrupts the light beam issuing from the source of light 51, and thus activates the motor 30, electrically connected to the photocell 50 through the relay 57. The motor immediately sends the shaft 31, and the attached thereto platform 32 with the egg perforating pins 38 downwardly through the eggs and returns into their normal upward position. The upward stroke of the motor is controlled and may be adjusted by a separate circuit in the timer 70, which circuit is connected to the relay 57. The action of the motor is extremely fast; it takes one-twentieth second for complete operation, and for that reason it is immaterial whether the carton is standing or moving when the perforating operation takes place. The photocell relay 57 must be reset by allowing the light to pass from the source of light 51 to the scanner 53 before it again activates the motor 30. The moment the main switch is turned on, the sterilizing tank 62 begins to send streams of mist through the nozzles 60. Upon the completion of the upward stroke of the motor 30, the solenoid valve 66 is opened for a half second by the timer 70, whereupon the air nozzle 65 delivers a powerful blast of air which sweeps the mist and moisture from the lower chamber 5 into the outlet 67. The device works with extreme speed, accuracy and efficiency and is very simple in operation.

I claim:

1. An egg perforating machine for simultaneous perforation of a commercial carton of eggs, comprising a slide for moving said cartons of eggs thereon; a guide on said slide for directing the movement of said egg cartons along a predetermined path; a plurality of egg perforating pins arranged above said slide for moving downwardly toward and through the eggs in the carton on said slide and returning to their normal position, said pins punching out a small hole in the lower end and a large hole in the upper end in said eggs; means for moving said pins downwardly and upwardly; means in the path of the cartons for automatically actuating said first mentioned means when a carton of eggs is moved to a predetermined position on said slide; means for sterilizing said pins when they return to their normal position; and means for automatically actuating the last mentioned means upon said pins returning to their normal position.

2. An egg perforating machine for simultaneous perforation of a commercial carton of eggs, comprising a slide for moving said carton of eggs thereon; a guide on said slide for directing the movement of said egg cartons along a predetermined path; a plurality of egg perforating pins arranged above said slide for moving downwardly and upwardly, means for moving said pins downwardly for perforating eggs in the carton on said slide and for returning said pins to their former position; electronic means for automatically actuating said first mentioned means when a carton of eggs is moved in a predetermined position on said slide; means for spraying said pins with germicide mist for keeping them sterile; and means for automatically actuating said spraying means upon said pins returning to their upper positions.

3. An egg perforating machine for simultaneous perforation of a commercial carton of eggs, comprising a slide for moving said cartons thereon; an egg perforating mechanism above said slide including a motor, a plurality of egg perforating pins arranged and spaced in the same manner as the eggs in said commercial carton, a platform for carrying said pins, means operatively connecting said platform with said motor for moving said platform and pins downwardly and back to its normal position, a chamber enclosing said platform and pins when the same are in the normal position; means for spraying said platform and pins inside said chamber with germicide mist; means for automatically actuating said motor when said carton of eggs reaches a predetermined position on said slide; and means for automatically blasting said mist out of said chamber when the pins return to its normal position.

4. An egg perforating machine for simultaneous perforation of a commercial carton of eggs, comprising a slide for moving said cartons thereon; an egg perforating mechanism above said slide including a motor, a plurality of egg perforating pins arranged and spaced in the same manner as the eggs in said commercial carton, a platform for carrying said pins, means operatively connecting said platform with said motor for moving said platform and pins downwardly and back to its normal position, a chamber enclosing said platform and pins when the same are in the normal position, means for spraying said platform and pins inside said chamber with germicide mist; means on said slide for guiding the cartons along a certain path; a photo-electric cell arranged in said path for actuation by the cartons moving along said path upon reaching a predeterminate position; said cell being operatively connected with said motor for actuating the latter when said cell is actuated by a carton; and a nozzle for automatically clearing the mist out of said chamber by a blast of compressed air when the pins return to its normal position.

5. A sanitary egg perforating machine for simultaneous perforation of a commercial carton of eggs comprising a slide for moving said carton of eggs thereon; an enclosure supported over said slide, said enclosure consisting of an upper and a lower compartment, the latter compartment having a bottom; an air motor in the upper compartment; a plurality of egg perforating pins in the lower compartment arranged in the same pattern as eggs in said carton; said lower compartment having in its bottom a hole opposite each of said pins; means for connecting said pins with the air motor for moving said pins downwardly through said holes and through the eggs in the carton placed on the slide under said lower compartment and withdrawing said pins back into the latter; means for spraying the inside of said lower compartment with sterilizing mist, and means for clearing the mist out of said lower compartment by a blast of compressed air after each return of the pins to their normal uppermost position.

References Cited by the Examiner

UNITED STATES PATENTS

| | | | |
|---|---|---|---|
| 774,948 | 11/1904 | Perry | 21—83 |
| 1,343,108 | 6/1920 | Buchanan | 21—82 |
| 2,445,490 | 7/1948 | Meade | 146—2 |
| 2,903,032 | 9/1959 | Cervene | 146—94 |
| 3,055,407 | 9/1962 | Conrad | 146—2 |

ROBERT C. RIORDON, *Primary Examiner.*

J. SPENCER OVERHOLSER, *Examiner.*

W. G. ABERCROMBIE, *Assistant Examiner.*